(12) United States Patent
Benson et al.

(10) Patent No.: US 7,281,063 B2
(45) Date of Patent: Oct. 9, 2007

(54) SIGNAL ROUTING CIRCUIT BOARD COUPLING CONTROLLER AND STORAGE ARRAY CIRCUIT BOARD FOR STORAGE SYSTEM

(75) Inventors: Anthony J. Benson, Fremont Center, NY (US); James J. deBlanc, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 277 days.

(21) Appl. No.: 10/624,625

(22) Filed: Jul. 22, 2003

(65) Prior Publication Data

US 2005/0021887 A1 Jan. 27, 2005

(51) Int. Cl.
G06F 13/00 (2006.01)
G06F 1/16 (2006.01)
H01R 12/04 (2006.01)

(52) U.S. Cl. .................... 710/2; 710/301; 711/114; 361/685; 361/788

(58) Field of Classification Search .................. 710/2, 710/5, 13, 33; 712/400
See application file for complete search history.

(56) References Cited

U.S. PATENT DOCUMENTS

| | | | |
|---|---|---|---|
| 5,729,763 A | 3/1998 | Leshem | |
| 6,023,754 A * | 2/2000 | DuLac et al. | 712/33 |
| 6,052,278 A | 4/2000 | Tanzer et al. | |
| 6,102,710 A * | 8/2000 | Beilin et al. | 439/67 |
| 6,208,522 B1 * | 3/2001 | Manweiler et al. | 361/752 |
| 6,274,807 B1 | 8/2001 | Pommerenke et al. | |
| 6,459,571 B1 * | 10/2002 | Carteau | 361/684 |
| 6,498,723 B1 | 12/2002 | Konshak et al. | |
| 6,517,358 B2 | 2/2003 | DeBlanc et al. | |
| 6,567,879 B1 | 5/2003 | Benson et al. | |
| 6,752,665 B2 * | 6/2004 | Kha et al. | 439/668 |
| 2002/0071192 A1 | 6/2002 | DeBlanc et al. | |
| 2002/0132588 A1 | 9/2002 | Benson | |
| 2002/0184424 A1 | 12/2002 | Benson et al. | |
| 2003/0021232 A1 * | 1/2003 | Duplaix et al. | 370/238 |
| 2003/0028698 A1 | 2/2003 | deBlanc et al. | |
| 2003/0193776 A1 * | 10/2003 | Bicknell et al. | 361/685 |
| 2004/0059970 A1 * | 3/2004 | Wieberdink et al. | 714/724 |
| 2004/0062002 A1 * | 4/2004 | Barringer et al. | 361/687 |
| 2004/0150581 A1 * | 8/2004 | Westerinen et al. | 345/1.3 |
| 2004/0193791 A1 * | 9/2004 | Felton et al. | 711/112 |
| 2004/0266065 A1 * | 12/2004 | Zhang et al. | 438/122 |

OTHER PUBLICATIONS

HP Storage Works Disk System 2300 User's Guide, Hewlett-Packard Company, Palo Alto, California, Edition E0902, pp. 1-158 (2002).

* cited by examiner

Primary Examiner—Ilwoo Park

(57) ABSTRACT

A signal routing circuit board has electronics common to circuit boards coupled to the signal routing circuit board. The signal routing circuit board may be coupled to a storage array circuit board and at least one input/output (I/O) controller circuit board. The storage array circuit board has storage device connectors to couple storage devices to the storage array circuit board.

16 Claims, 6 Drawing Sheets

US 7,281,063 B2

SIGNAL ROUTING CIRCUIT BOARD COUPLING CONTROLLER AND STORAGE ARRAY CIRCUIT BOARD FOR STORAGE SYSTEM

TECHNICAL FIELD

The present invention relates to the field of storage systems.

BACKGROUND ART

Storage systems are used by computer systems to store data. One storage system comprises an array of a plurality of disk drives to help provide increased storage capacity, increased storage availability, increased storage and retrieval speed, and/or fault tolerance.

SUMMARY

A signal routing circuit board has electronics common to circuit boards coupled to the signal routing circuit board. The signal routing circuit board may be coupled to a storage array circuit board and at least one input/output (I/O) controller circuit board. The storage array circuit board has storage device connectors to couple storage devices to the storage array circuit board.

BRIEF DESCRIPTION OF DRAWINGS

One or more embodiments of the present invention are illustrated by way of example and not limitation in the figures of the accompanying drawings, in which like references indicate similar elements and in which.

DETAILED DESCRIPTION

The following detailed description sets forth an embodiment or embodiments for a signal routing circuit board for a storage system.

Storage System

Figure 1:
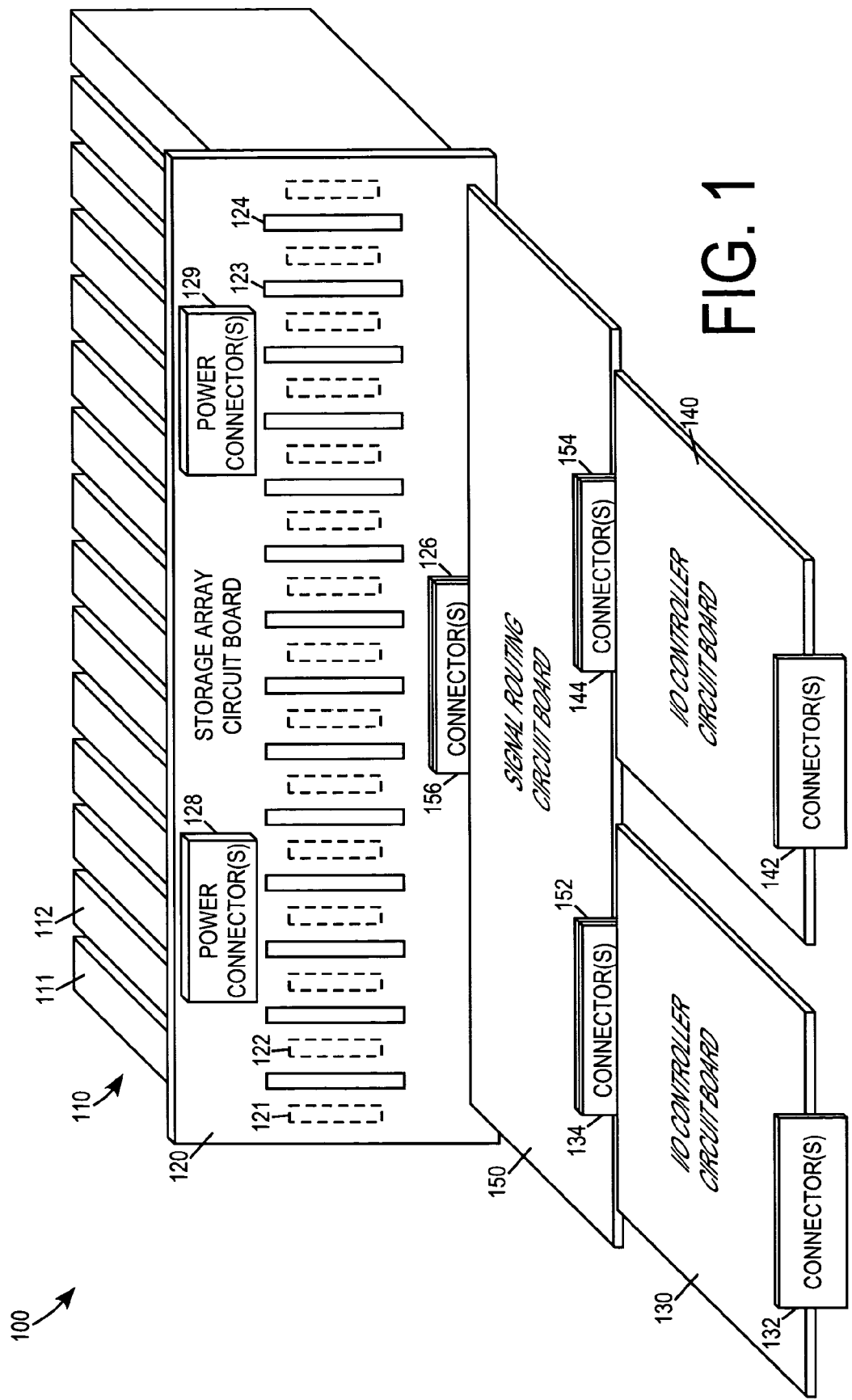
FIG. 1 illustrates, for one embodiment, a storage system comprising a signal routing circuit board and a storage array circuit board.

FIG. 1 illustrates, for one embodiment, a storage system 100. Storage system 100 may be used to store data, including software, in one or more of a plurality of storage devices 110. Storage system 100 comprises the plurality of storage devices 110, a storage array circuit board 120, an input/output (I/O) controller circuit board 130, an I/O controller circuit board 140, and a signal routing circuit board 150.

Storage system 100 may comprise any suitable type of storage devices 110, such as magnetic disk drives, optical disk drives, magneto-optic disk drives, solid-state disk drives, and/or magnetic tape drives for example.

Storage array circuit board 120 has a plurality of storage device connectors, such as storage device connector(s) 121 and storage device connector(s) 122 for example, to mate with corresponding connectors coupled to storage devices 110, allowing storage array circuit board 120 to communicate with storage devices 110. As illustrated in FIG. 1, connector(s) 121 and connector(s) 122 couple storage devices 111 and 112, respectively, to storage array circuit board 120. Storage array circuit board 120 may have any suitable number of any suitable type of one or more connectors to couple any one storage device 110 to storage array circuit board 120. Storage array circuit board 120 for one embodiment may have one or more storage device connectors for removable coupling or connection of one or more of storage devices 110 to storage array circuit board 120.

Storage devices 110 for one embodiment, as illustrated in FIG. 1, may be directly connected to storage array circuit board 120. For another embodiment, one or more of storage devices 110 may be indirectly coupled to storage array circuit board 120 through one or more other devices, such as another storage device for example. Although illustrated in FIG. 1 as having connectors to couple 15 storage devices to storage array circuit board 120, storage array circuit board 120 may have connectors to couple any suitable number of storage devices to storage array circuit board 120.

Storage array circuit board 120 for one embodiment, as illustrated in FIG. 1, may have connectors positioned on the same surface of storage array circuit board 120 to mate with corresponding connectors connected at or near respective ends of storage devices 110 to allow storage devices 110 to be positioned in a side-by-side manner. Storage array circuit board 120 for this embodiment may also be described as a midplane circuit board. For another embodiment, storage array circuit board 120 may have connectors for storage devices positioned in another suitable arrangement.

Storage array circuit board 120 for one embodiment may define a plurality of openings in storage array circuit board 120, such as openings 123 and 124 for example, to allow air to flow through storage array circuit board 120. Such openings help dissipate heat generated by storage devices 110. Storage array circuit board 120 for one embodiment, as illustrated in FIG. 1, may define one or more openings between adjacent connectors for storage devices 110 to facilitate airflow between adjacent storage devices. Storage array circuit board 120 may define any suitable number of one or more openings in any suitable location(s) in storage array circuit board 120.

I/O controller circuit board 130 and/or I/O controller circuit board 140 help control storing or writing data to storage devices 110 for one or more hosts in communication with storage system 100 and/or help control reading or retrieving data from storage devices 110 for one or more hosts in communication with storage system 100.

I/O controller circuit board 130 has one or more connectors 132 to mate with corresponding connector(s) coupled directly or indirectly to one or more hosts or to one or more devices in wireless communication with one or more hosts. Connector(s) 132 may comprise any suitable type or types of connector(s). I/O controller circuit board 140 has one or more connectors 142 to mate with corresponding connector (s) coupled directly or indirectly to one or more hosts or to one or more devices in wireless communication with one or more hosts. Connector(s) 142 may comprise any suitable type or types of connector(s). Connector(s) 132 and/or connector(s) 142 for one embodiment help allow for removable coupling of one or more hosts to I/O controller circuit boards 130 and/or 140, respectively.

Connector(s) 132 and connector(s) 142 for one embodiment, as illustrated in FIG. 1, may be connected to I/O controller circuit boards 130 and 140, respectively, at or near an edge of an end or side of I/O controller circuit boards 130 and 140, respectively. Connector(s) 132 and/or connector(s) 142 for another embodiment may be connected to I/O controller circuit board 130 and/or I/O controller circuit board 140 at any other suitable location. I/O controller circuit board 130 and/or I/O controller circuit board 140 for another embodiment may each have one or more other connectors connected to I/O controller circuit board 130 and/or I/O controller circuit board 140, respectively, at any suitable location to communicate with one or more hosts.

I/O controller circuit board 130 and I/O controller circuit board 140 may communicate with one or more of storage devices 110 through signal routing circuit board 150 and storage array circuit board 120.

I/O controller circuit board 130 has one or more connectors 134 to couple I/O controller circuit board 130 to signal routing circuit board 150, allowing I/O controller circuit board 130 to communicate with signal routing circuit board 150. Connector(s) 134 may comprise any suitable type or types of connector(s). I/O controller circuit board 140 has one or more connectors 144 to couple I/O controller circuit board 140 to signal routing circuit board 150, allowing I/O controller circuit board 140 to communicate with signal routing circuit board 150. Connector(s) 144 may comprise any suitable type or types of connector(s). Connector(s) 134 and connector(s) 144 for one embodiment, as illustrated in FIG. 1, may be connected to I/O controller circuit boards 130 and 140, respectively, at or near an edge of an end or side of I/O controller circuit boards 130 and 140, respectively. Connector(s) 134 and/or connector(s) 144 for another embodiment may be connected to I/O controller circuit board 130 and/or I/O controller circuit board 140, respectively, at any other suitable location.

Signal routing circuit board 150 routes signals from I/O controller circuit board 130 and/or I/O controller circuit board 140 to storage array circuit board 120 to help I/O controller circuit board 130 and/or I/O controller circuit board 140, respectively, communicate with storage devices 110. Signal routing circuit board 150 for one embodiment may also route signals between I/O controller circuit boards 130 and 140. Signal routing circuit board 150 for one embodiment has electronics common to I/O controller circuit board 130, I/O controller circuit board 140, and/or storage array circuit board 120.

Signal routing circuit board 150 has one or more connectors 152 to couple signal routing circuit board 150 to I/O controller circuit board 130, allowing signal routing circuit board 150 to communicate with I/O controller circuit board 130. Connector(s) 152 may comprise any suitable type or types of connector(s). Signal routing circuit board 150 has one or more connectors 154 to couple signal routing circuit board 150 to I/O controller circuit board 140, allowing signal routing circuit board 150 to communicate with I/O controller circuit board 140. Connector(s) 154 may comprise any suitable type or types of connector(s). Connector(s) 152 and connector(s) 154 for one embodiment, as illustrated in FIG. 1, may be connected to signal routing circuit board 150 at or near an edge of an end or side of signal routing circuit board 150. Connector(s) 152 and/or connector(s) 154 for another embodiment may be connected to signal routing circuit board 150 at any other suitable location. Signal routing circuit board 150 for another embodiment may have only connector(s) 152 or only connector(s) 154 to couple only one I/O controller circuit board 130 or 140, respectively, to signal routing circuit board 150. Signal routing circuit board 150 for another embodiment may have, in addition to connectors 152 and 154, one or more other connectors connected to signal routing circuit board 150 at any suitable location to communicate, for example, with one or more I/O controller circuit boards and/or a system circuit board.

For one embodiment, as illustrated in FIG. 1, connector(s) 134 and connector(s) 144 may be mated with connector(s) 152 and connector(s) 154, respectively, to connect I/O controller circuit boards 130 and 140, respectively, directly to signal routing circuit board 150. Connector(s) 134 and/or connector(s) 144 for one embodiment help allow for removable coupling or connection of connector(s) 152 and/or connector(s) 154, respectively, to I/O controller circuit boards 130 and/or 140, respectively. Connector(s) 134 and connector(s) 144 for one embodiment may be connected to connector(s) 152 and connector(s) 154, respectively, through a cable, for example. Connector(s) 134 and connector(s) 144 for one embodiment may be indirectly coupled to connector(s) 152 and connector(s) 154, respectively, through one or more devices.

Signal routing circuit board 150 has one or more connectors 156 to couple signal routing circuit board 150 to storage array circuit board 120, allowing signal routing circuit board 150 to communicate with storage array circuit board 120. Connector(s) 156 may comprise any suitable type or types of connector(s). Connector(s) 156 for one embodiment, as illustrated in FIG. 1, may be connected to signal routing circuit board 150 at or near an edge of an end or side of signal routing circuit board 150. Connector(s) 156 for another embodiment may be connected to signal routing circuit board 150 at any other suitable location. Signal routing circuit board 150 for another embodiment may have one or more other connectors connected to signal routing circuit board 150 at any suitable location to communicate, for example, with one or more storage array circuit boards.

Storage array circuit board 120 routes signals from signal routing circuit board 150 to storage devices 110 to help I/O controller circuit board 130 and/or I/O controller circuit board 140 communicate with storage devices 110.

Storage array circuit board 120 has one or more connectors 126 to couple storage array circuit board 120 to signal routing circuit board 150, allowing storage array circuit board 120 to communicate with signal routing circuit board 150. Connector(s) 126 may comprise any suitable type or types of connector(s). Connector(s) 126 for one embodiment, as illustrated in FIG. 1, may be connected to storage array circuit board 120 on a surface opposite storage devices 110 at or near an edge of an end or side of storage array circuit board 120. Connector(s) 126 for another embodiment may be connected to storage array circuit board 120 at any other suitable location. Storage array circuit board 120 for another embodiment may have one or more other connectors connected to storage array circuit board 120 at any suitable location to communicate, for example, with one or more signal routing circuit boards.

For one embodiment, as illustrated in FIG. 1, connector(s) 156 may be mated with connector(s) 126 to connect signal routing circuit board 150 directly to storage array circuit board 120. Connector(s) 156 for one embodiment help allow for removable coupling or connection of connector(s) 126 to signal routing circuit board 150. Connector(s) 156 for one embodiment may be connected to connector(s) 126 through a cable, for example. Connector(s) 156 for one embodiment may be indirectly coupled to connector(s) 126 through one or more devices.

Storage array circuit board 120 for one embodiment, as illustrated in FIG. 1, has one or more connectors 128 and one or more connectors 129 to mate with corresponding connectors coupled to one or more power supplies, allowing storage array circuit board 120 to receive power and/or to communicate with one or more power supplies. Connector(s) 128 may comprise any suitable type or types of connector(s), and connector(s) 129 may comprise any suitable type or types of connector(s). Connector(s) 128 and/or connector(s) 129 for one embodiment help allow for removable coupling or connection of one or more power supplies to storage array circuit board 120. Storage array circuit board 120 for one embodiment may be coupled to two power supplies to provide for redundant power.

Storage array circuit board 120 for one embodiment may distribute power and/or route power status and/or control signals, for example, to one or more devices, if any, of storage array circuit board 120; to one or more of storage devices 110 through one or more storage device connectors of storage array circuit board 120; to one or more devices, if any, of signal routing circuit board 150 through connector(s) 126; to one or more devices of I/O controller circuit board 130 through connector(s) 126, signal routing circuit board 150, and connector(s) 152; and/or to one or more devices of I/O controller circuit board 140 through connector(s) 126, signal routing circuit board 150, and connector(s) 154.

Connectors 128 and 129 for one embodiment, as illustrated in FIG. 1, may be connected to storage array circuit board 120 on a surface opposite storage devices 110 at or near an edge of an end or side of storage array circuit board 120. Connectors 128 and 129 for another embodiment may be connected to storage array circuit board 120 at any other suitable location. Storage array circuit board 120 for another embodiment may have only connector(s) 128 or only connector(s) 129 to receive power. Storage array circuit board 120 for another embodiment may have, in addition to connectors 128 and 129, one or more other power connectors connected to storage array circuit board 120 at any suitable location to receive power.

Storage Array and Signal Routing Circuit Boards

Storage array circuit board 120 and signal routing circuit board 150 may be designed in any suitable manner to support one or more suitable topologies for storage system 100.

As one example, storage array circuit board 120 and signal routing circuit board 150 may be designed to allow both I/O controller circuit board 130 and I/O controller circuit board 140 to access any of storage devices 110. I/O controller circuit boards 130 and 140 for one embodiment may then share any one or more of storage devices 110 for two or more hosts coupled to I/O controller circuit boards 130 and 140. I/O controller circuit boards 130 and 140 for another embodiment may alternatively provide redundant access to any of storage devices 110 for one host coupled to both I/O controller circuit boards 130 and 140.

As another example, storage array circuit board 120 and signal routing circuit board 150 may be designed to allow I/O controller circuit board 130 to access one or more but less than all of storage devices 110 and I/O controller circuit board 140 to access one or more but less than all of storage devices 110 for one or more hosts coupled to I/O controller circuit boards 130 and 140.

Signal routing circuit board 150 for one embodiment may be designed to help simplify the design of storage array circuit board 120 and therefore help increase the mean time to failure (MTTF) and decrease the annualized failure rate (AFR) of storage array circuit board 120. Signal routing circuit board 150 may be designed, for example, to help reduce the number of connectors for storage array circuit board 120, to help minimize signal paths on storage array circuit board 120, to help reduce the number of active devices of storage array circuit board 120, and/or to help reduce the number of circuit board layers of storage array circuit board 120. Where storage array circuit board 120 is not customer-replaceable or field-replaceable, storage system 100 for one embodiment may then be designed with signal routing circuit board 150 as a customer or field replaceable unit to facilitate the ability to repair storage system 100 on-site without removal of storage array circuit board 120.

Signal routing circuit board 150 for one embodiment may be designed to help simplify the design of one or more of storage devices 110, I/O controller circuit board 130, and/or I/O controller circuit board 140, for example, to help reduce the number of active devices in one or more of storage devices 110, I/O controller circuit board 130, and/or I/O controller circuit board 140.

Signal routing circuit board 150 for one embodiment may be designed to help further divide storage system 100 into distinct functional blocks to facilitate the ability to upgrade or substitute one or more functional blocks for storage system 100 by replacing I/O controller circuit board 130, I/O controller circuit board 140, and/or signal routing circuit board 150.

FIGS. 2, 3, 4, and 5 illustrate example embodiments of storage array circuit board 120 and signal routing circuit board 150.

Figure 2:
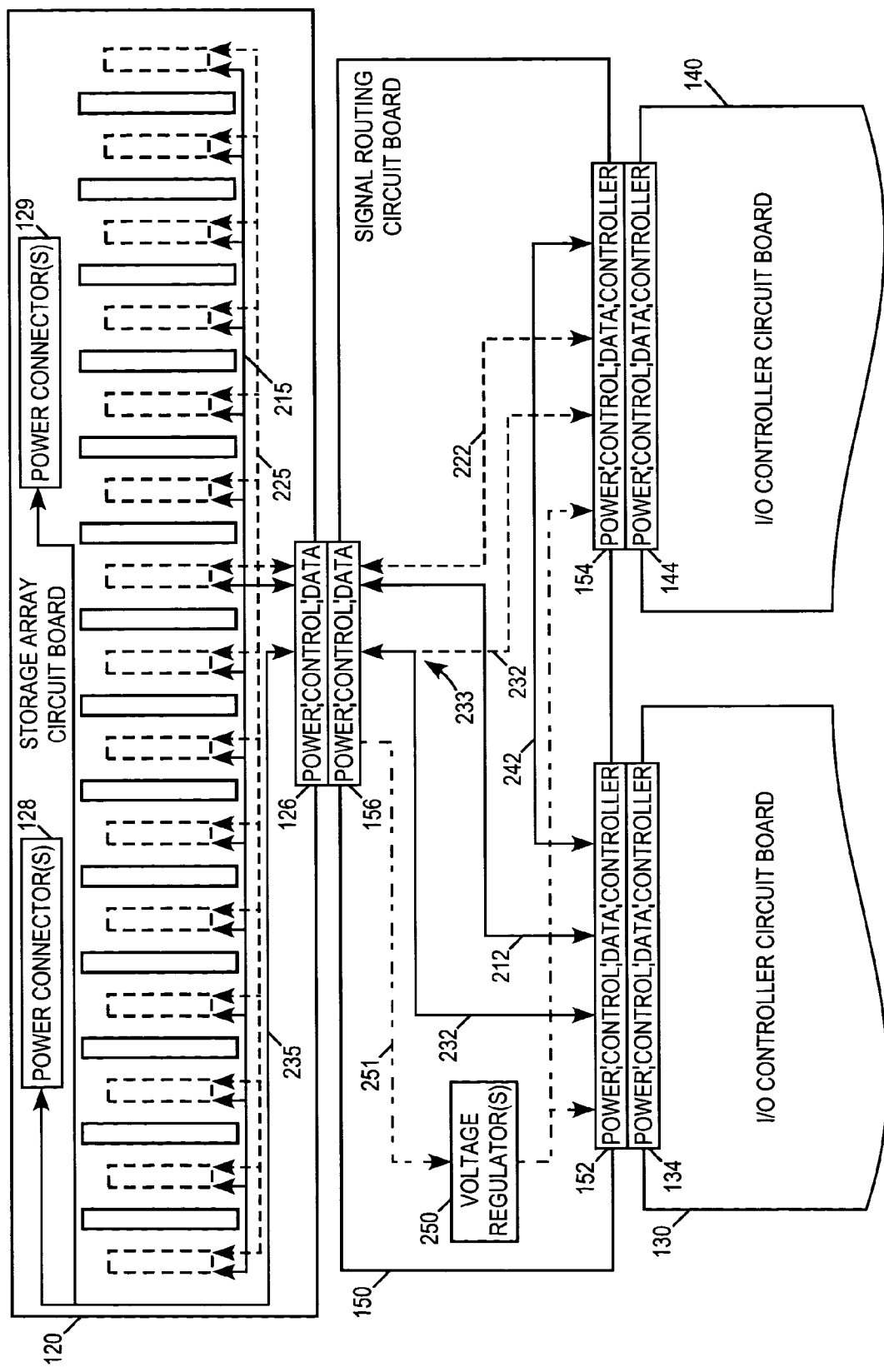
FIG. 2 illustrates, for one embodiment, a signal routing circuit board and a storage array circuit board for a storage system.

As illustrated in FIG. 2, signal routing circuit board 150 for one embodiment may define one or more data signal paths 212 between connector(s) 152 and connector(s) 156 to route data signals between I/O controller circuit board 130 and storage array circuit board 120 and may define one or more data signal paths 222 between connector(s) 154 and connector(s) 156 to route data signals between I/O controller circuit board 140 and storage array circuit board 120.

For one embodiment where signal routing circuit board 150 defines data signal path(s) 212 and data signal path(s) 222 to route signals through the same one connector housing for connector(s) 156, signal routing circuit board 150 helps simplify the design of storage array circuit board 120 as storage array circuit board 120 for one embodiment may then transmit data signals to and receive data signals from two I/O controller circuit boards 130 and 140 through only one connector housing for connector(s) 126.

Storage array circuit board 120 for one embodiment may define one or more data signal paths 215 between one or more storage device connectors and connector(s) 126 to communicate with corresponding data signal path(s) 212 of signal routing circuit board 150. Storage array circuit board 120 for one embodiment may also define one or more data signal paths 225 between one or more storage device connectors and connector(s) 126 to communicate with corresponding data signal path(s) 222 of signal routing circuit board 150. Storage array circuit board 120 may define one or more data signal paths 215 and one or more data signal paths 225 to support any suitable interconnection of any of storage devices 110 for any suitable interface technology, such as Small Computer System Interface (SCSI) technology, Fibre Channel technology, Parallel AT Attachment (Parallel ATA) technology, or Serial ATA technology for example.

Signal routing circuit board 150 for one embodiment may also define one or more control signal paths 232 between connector(s) 152 and connector(s) 156 and/or between connector(s) 154 and connector(s) 156 to route power control and/or status signals between I/O controller circuit board 130 and storage array circuit board 120 and/or between I/O controller circuit board 140 and storage array circuit board 120, respectively. Signal routing circuit board 150 for one embodiment may define one or more of control signal path(s) 232 to be shared by I/O controller circuit boards 130 and 140, helping to simplify the design of storage array circuit board 120 as storage array circuit board 120 for one embodiment may then transmit power control and/or status signals to and/or receive power control and/or status signals from two I/O controller circuit boards 130 and 140 using fewer signal path(s) through connector(s) 126.

Storage array circuit board 120 for one embodiment may define one or more control signal paths 235 between connector(s) 128 and connector(s) 126 and between connector(s) 129 and connector(s) 126 to communicate with corresponding control signal path(s) 232 of signal routing circuit board 150. Storage array circuit board 120 for one embodiment may define one or more control signal paths to be shared with connectors 128 and 129.

Signal routing circuit board 150 for one embodiment may define one or more controller signal paths 242 between connector(s) 152 and connector(s) 154 to route signals between I/O controller circuit boards 130 and 140. Signal routing circuit board 150 may therefore help simplify the design of storage array circuit board 120 as I/O controller circuit boards 130 and 140 may communicate with one another without routing signals through storage array circuit board 120.

Storage array circuit board 120 for one embodiment may supply power at one or more levels, such as at 12 volts (V), 5 V, and/or 3.3 V for example, to one or more of storage devices 110 by defining one or more power supply paths from connectors 128 and 129 to one or more storage device connectors of storage array circuit board 120. Storage array circuit board 120 for one embodiment may supply power at one or more levels, such as at 5 V and/or 3.3 V for example, to signal routing circuit board 150 by defining one or more power supply paths from connectors 128 and 129 to connector(s) 126. Storage array circuit board 120 may define one or more power supply paths in any suitable manner.

Signal routing circuit board 150 for one embodiment may define one or more power supply paths from connector(s) 156 throughout signal routing circuit board 150 to distribute power at one or more levels throughout signal routing circuit board 150. Signal routing circuit board 150 for one embodiment may define one or more power supply paths from connector(s) 156 to connector(s) 152 and/or to connector(s) 154 to supply power at one or more levels to I/O controller circuit board 130 and/or to I/O controller circuit board 140, respectively. Signal routing circuit board 150 for one embodiment may define one or more power supply paths to be shared by I/O controller circuit boards 130 and 140, helping to simplify the design of storage array circuit board 120 as storage array circuit board 120 for one embodiment may then supply power to two I/O controller circuit boards 130 and 140 using fewer power supply path(s) through connector(s) 126.

Where I/O controller circuit board 130 and/or I/O controller circuit board 140 are to use one or more power supply levels that differ from one or more power supply levels supplied through connector(s) 156, signal routing circuit board 150 for one embodiment, as illustrated in FIG. 2, may have one or more voltage regulators 250 and define one or more power supply paths 251 from connector(s) 156 and through voltage regulator(s) 250 to connector(s) 152 and/or connector(s) 154 to supply power to I/O controller circuit board 130 and/or I/O controller circuit board 140, respectively. As one example, voltage regulator(s) 250 for one embodiment may receive power at 5 V and/or 3.3 V, for example, and supply power at 2.5 V, 1.8 V, and/or 1.5 V, for example. Signal routing circuit board 150 may therefore help simplify the design of storage array circuit board 120, I/O controller circuit board 130, and/or I/O controller circuit board 140 as storage array circuit board 120, I/O controller circuit board 130, and/or I/O controller circuit board 140 may be designed with fewer or no such voltage regulator(s).

Signal routing circuit board 150 may comprise any suitable number of layers to define one or more signal paths and/or one or more power supply paths in any suitable manner. Signal routing circuit board 150 for one embodiment may comprise, in order, a first signal layer, a first ground layer, a first power layer, a second power layer, a second ground layer, and a second signal layer. Signal routing circuit board 150 for another embodiment may comprise, in order, a first signal layer, a ground layer, a power layer, and a second signal layer.

To facilitate signal and/or power routing, connector(s) 152, connector(s) 154, and/or connector(s) 156 for one embodiment may optionally be divided into separate sections, such as power, control signal, data signal, and/or controller signal sections for example. Connector(s) 152, connector(s) 154, and/or connector(s) 156 for one embodiment may be divided into separate connectors based on one or more such sections. Connector(s) 152, connector(s) 154, and/or connector(s) 156 for one embodiment may be divided into different types of connectors to suit different types of signals. As one example, connector(s) 152, connector(s) 154, and/or connector(s) 156 for one embodiment may each be divided into two connectors: one connector for power and another connector for control, data, and/or controller signals.

For one embodiment where signal paths are to cross one another, signal routing circuit board 150 may define such signal paths on different layers. Signal routing circuit board 150 may optionally define one signal path across multiple layers. As one example, as illustrated in FIG. 2, signal routing circuit board 150 for one embodiment may define data signal path(s) 212 and controller signal path(s) 242 on a first signal layer and data signal path(s) 222 on a second signal layer above or below the first signal layer. Signal routing circuit board 150 may define control signal path(s) 232 on both the first and second signal layers, noting control signal path(s) 232 change layers at location 233. Signal routing circuit board 150 for another embodiment may define data signal path(s) 212, data signal path(s) 222, control signal path(s) 232, and/or controller signal path(s) 242 on different layers and/or across multiple layers in any other suitable manner.

Signal routing circuit board 150 for one embodiment may have one or more active devices to help simplify the design of one or more of storage devices 110, storage array circuit board 120, I/O controller circuit board 130, and/or I/O controller circuit board 140 by helping to reduce the number of active devices in one or more of storage devices 110, storage array circuit board 120, I/O controller circuit board 130, and/or I/O controller circuit board 140.

Figure 3:
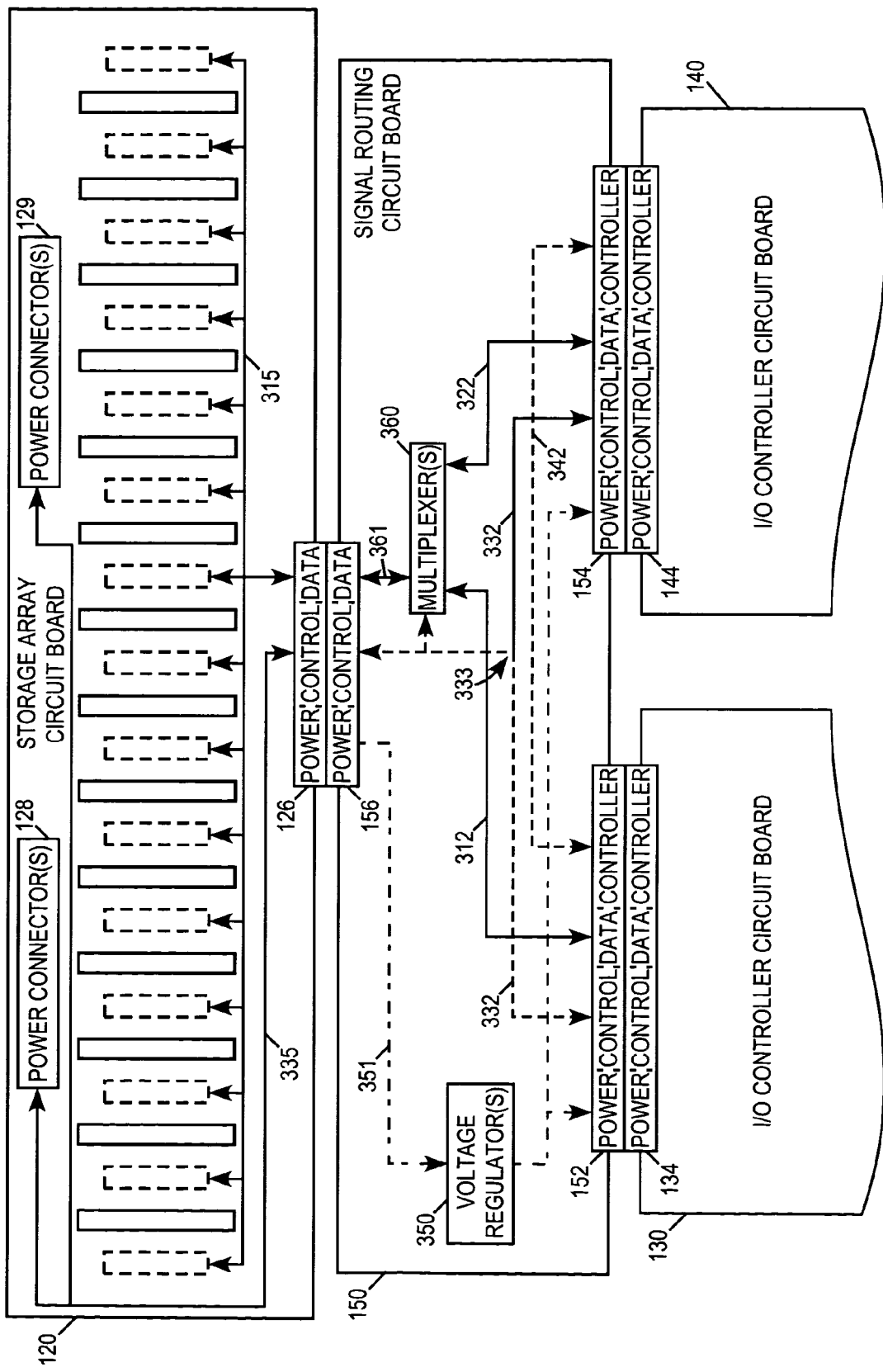
FIG. 3 illustrates, for another embodiment, a signal routing circuit board and a storage array circuit board for a storage system.

For one embodiment, as illustrated in FIG. 3, signal routing circuit board 150 may have one or more multiplexers 360 to route data signals in a selective manner from either I/O controller circuit board 130 or I/O controller circuit board 140 to storage array circuit board 120. Designing signal routing circuit board 150 with multiplexer(s) 360 helps simplify the design of storage array circuit board 120 and/or storage devices 110 as storage array circuit board 120 and any one of storage devices 110 may be designed to transmit data signals to and receive data signals from either I/O controller circuit board 130 or 140 without having active devices to provide switching capability between different data signal paths.

Signal routing circuit board 150 for one embodiment may define one or more data signal paths 312 between connector(s) 152 and connector(s) 156 and through multiplexer(s) 360 to route data signals between I/O controller circuit board 130 and storage array circuit board 120 and may define one or more data signal paths 322 between connector(s) 154 and connector(s) 156 and through multiplexer(s) 360 to route data signals between I/O controller circuit board 140 and storage array circuit board 120. Multiplexer(s) 360 may be controlled in any suitable manner to route data signals in a selective manner between I/O controller circuit board 130 and storage array circuit board 120 and between I/O controller circuit board 140 and storage array circuit board 120.

Signal routing circuit board 150 for one embodiment may define a portion 361 of one or more of data signal path(s) 312 and data signal path(s) 322 between multiplexer(s) 360 and connector(s) 156 to be shared by both data signal paths 312 and 322. Multiplexer(s) 360 may then route data signals in a selective manner along shared portion 361, helping to simplify the design of storage array circuit board 120 as storage array circuit board 120 for one embodiment may then transmit data signals to and receive data signals from both 110 controller circuit boards 130 and 140 using fewer signal path(s) on storage array circuit board 120 and through connector(s) 126. Storage array circuit board 120 for one embodiment may define one or more shared data signal paths 315 between one or more storage device connector(s) and connector(s) 126 to communicate with both data signal path(s) 312 and data signal path(s) 322 of signal routing circuit board 150, helping to simplify the design of storage array circuit board 120 as storage array circuit board 120 for one embodiment may then comprise fewer layers to define one or more signal paths. Storage array circuit board 120 may define one or more data signal paths 315 to support any suitable interconnection of any of storage devices 110 for any suitable interface technology. Storage array circuit board 120 for one embodiment may define one or more data signal paths 315 to support a serial interface technology, such as Serial AT Attachment (Serial ATA) technology for example.

Signal routing circuit board 150 for one embodiment, as illustrated in FIG. 3, may define one or more control signal paths 332 and/or one or more controller signal paths 342 similarly as control signal path(s) 232 and/or controller signal path(s) 242, respectively, of FIG. 2. Signal routing circuit board 150 for one embodiment, as illustrated in FIG. 3, may define one or more of control signal path(s) 332 to control multiplexer(s) 360 from I/O controller circuit board 130 and/or from I/O controller circuit board 140. Storage array circuit board 120 for one embodiment may define one or more control signal paths 335 similarly as control signal path(s) 235 of FIG. 2.

Signal routing circuit board 150 for one embodiment, as illustrated in FIG. 3, may have one or more voltage regulators 350 similarly as voltage regulator(s) 250 of FIG. 2 and define one or more power supply paths 351 similarly as power supply path(s) 251 of FIG. 2.

Signal routing circuit board 150 for one embodiment, as illustrated in FIG. 3, may define data signal path(s) 312 and data signal path(s) 322 on a first signal layer and controller signal path(s) 342 on a second signal layer above or below the first signal layer. Signal routing circuit board 150 may define control signal path(s) 332 on both the first and second signal layers, noting control signal path(s) 332 change layers at location 333. Signal routing circuit board 150 for another embodiment may define data signal path(s) 312, data signal path(s) 322, control signal path(s) 332, and/or controller signal path(s) 342 on different layers and/or across multiple layers in any other suitable manner.

Figure 4:
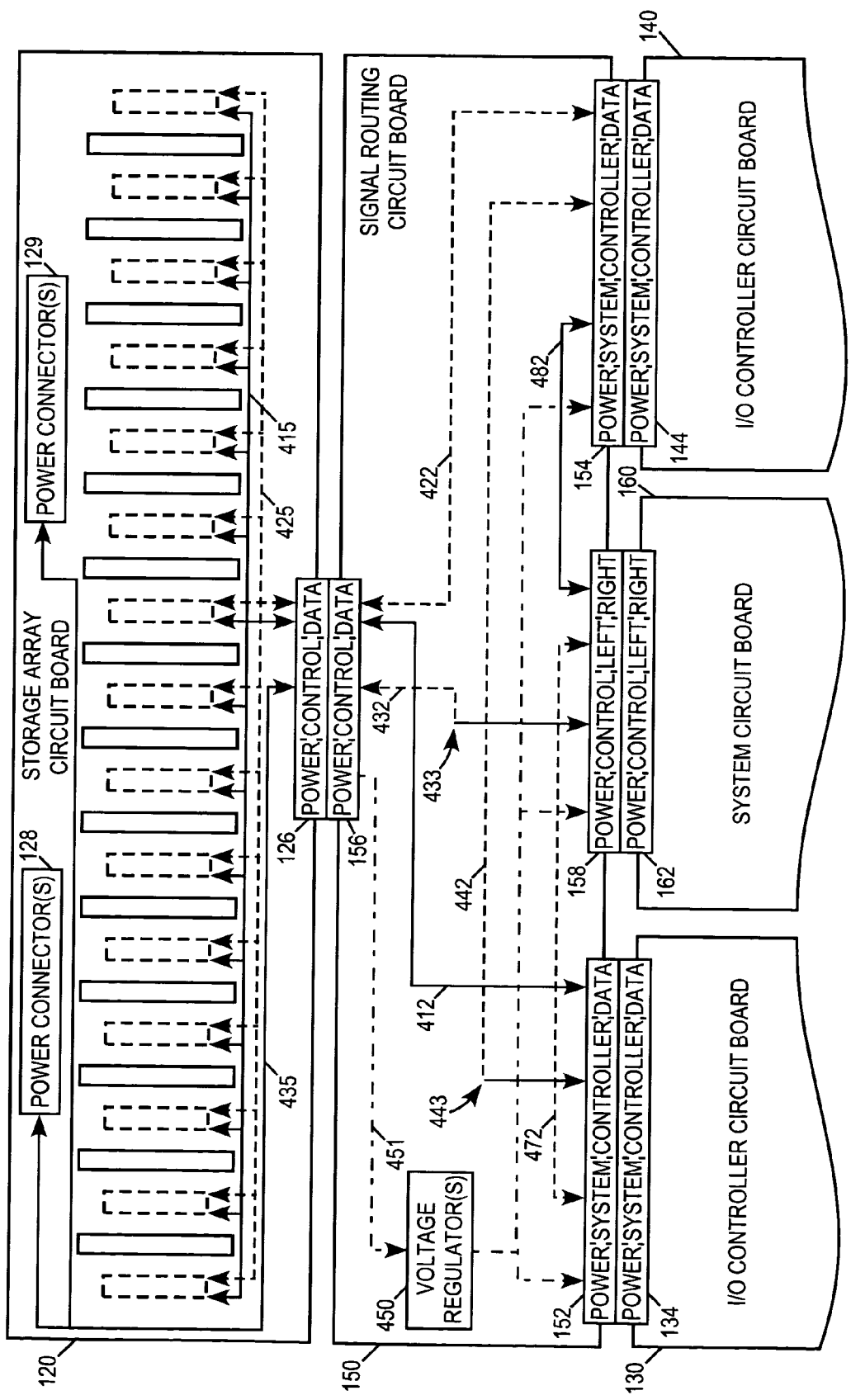
FIG. 4 illustrates, for another embodiment, a signal routing circuit board and a storage array circuit board for a storage system.

Signal routing circuit board 150 for one embodiment, as illustrated in FIG. 4, may be designed to support a system circuit board 160 with minimized impact on the design of storage array circuit board 120. System circuit board 160 for one embodiment helps perform management services and control functions for storage system 100, helping to simplify the design of I/O controller circuit board 130 and/or I/O controller circuit board 140. Although described in connection with using a separate system circuit board 160 to be coupled to signal routing circuit board 150, signal routing circuit board 150 for another embodiment may be designed to incorporate the functionality of system circuit board 160 into signal routing circuit board 150.

System circuit board 160 has one or more connectors 162 to couple system circuit board 160 to signal routing circuit board 150, allowing system circuit board 160 to communicate with signal routing circuit board 150. Connector(s) 162 may comprise any suitable type or types of connector(s). Connector(s) 162 for one embodiment may be connected to system circuit board 160 at or near an edge of an end or side of system circuit board 160. Connector(s) 162 for another embodiment may be connected to system circuit board 160 at any other suitable location.

Signal routing circuit board 150 for one embodiment, as illustrated in FIG. 4, may have one or more connectors 158 to couple signal routing circuit board 150 to system circuit board 160. Connector(s) 158 may comprise any suitable type or types of connector(s). Connector(s) 158 for one embodiment may be connected to signal routing circuit board 150 at or near an edge of an end or side of signal routing circuit board 150. Connector(s) 158 for another embodiment may be connected to signal routing circuit board 150 at any other suitable location.

For one embodiment, connector(s) 162 may be mated with connector(s) 158 to connect system circuit board 160 directly to signal routing circuit board 150. Connector(s) 162 for one embodiment help allow for removable coupling or connection of connector(s) 158 to system circuit board 160. Connector(s) 162 for one embodiment may be connected to connector(s) 158 through a cable, for example. Connector(s) 162 for one embodiment may be indirectly coupled to connector(s) 158 through one or more devices.

Signal routing circuit board 150 for one embodiment, as illustrated in FIG. 4, may define one or more data signal paths 412, one or more data signal paths 422, and/or one or more controller signal paths 442 similarly as data signal path(s) 212, data signal path(s) 222, and/or controller signal path(s) 242, respectively, of FIG. 2.

Signal routing circuit board 150 for one embodiment, as illustrated in FIG. 4, may define one or more control signal paths 432 between connector(s) 158 and connector(s) 156 to route power control and/or status signals between system circuit board 160 and storage array circuit board 120 similarly as control signal path(s) 232 of FIG. 2. Signal routing circuit board 150 for one embodiment may define one or more system signal paths 472 between connector(s) 158 and connector(s) 152 to route signals between system circuit board 160 and I/O controller circuit board 130. Signal routing circuit board 150 for one embodiment may define one or more system signal paths 482 between connector(s) 158 and connector(s) 154 to route signals between system circuit board 160 and I/O controller circuit board 140.

Signal routing circuit board 150 may therefore help support system circuit board 160 with minimized impact on the design of storage array circuit board 120 as storage array circuit board 120 for one embodiment may interface with signal routing circuit board 150 similarly as for the design of FIG. 2, noting system circuit board 160 may communicate with I/O controller circuit boards 130 and 140 without routing signals through storage array circuit board 120.

Storage array circuit board 120 for one embodiment, as illustrated in FIG. 4, may define one or more data signal paths 415, one or more data signal paths 425, and/or one or more control signal paths 435 similarly as data signal path(s) 215, data signal path(s) 225, and/or control signal path(s) 235, respectively, of FIG. 2.

Signal routing circuit board 150 for one embodiment may define one or more power supply paths from connector(s) 156 to connector(s) 158 to supply power at one or more levels to system circuit board 160. Signal routing circuit board 150 for one embodiment, as illustrated in FIG. 4, may have one or more voltage regulators 450 and define one or more power supply paths 451 from connector(s) 156 and through voltage regulator(s) 450 to connector(s) 152, connector(s) 154, and/or connector(s) 158.

Signal routing circuit board 150 for one embodiment, as illustrated in FIG. 4, may define data signal path(s) 412 and system signal path(s) 482 on a first signal layer and data signal path(s) 422 and system signal path(s) 472 on a second signal layer above or below the first signal layer. Signal routing circuit board 150 may define control signal path(s) 432 on both the first and second signal layers, noting control signal path(s) 432 change layers at location 433, and define controller signal path(s) 442 on both the first and second signal layers, noting controller signal path(s) 442 change layers at location 443. Signal routing circuit board 150 for another embodiment may define data signal path(s) 412, data signal path(s) 422, control signal path(s) 432, controller signal path(s) 442, system signal path(s) 472, and/or system signal path(s) 482 on different layers and/or across multiple layers in any other suitable manner.

Figure 5:
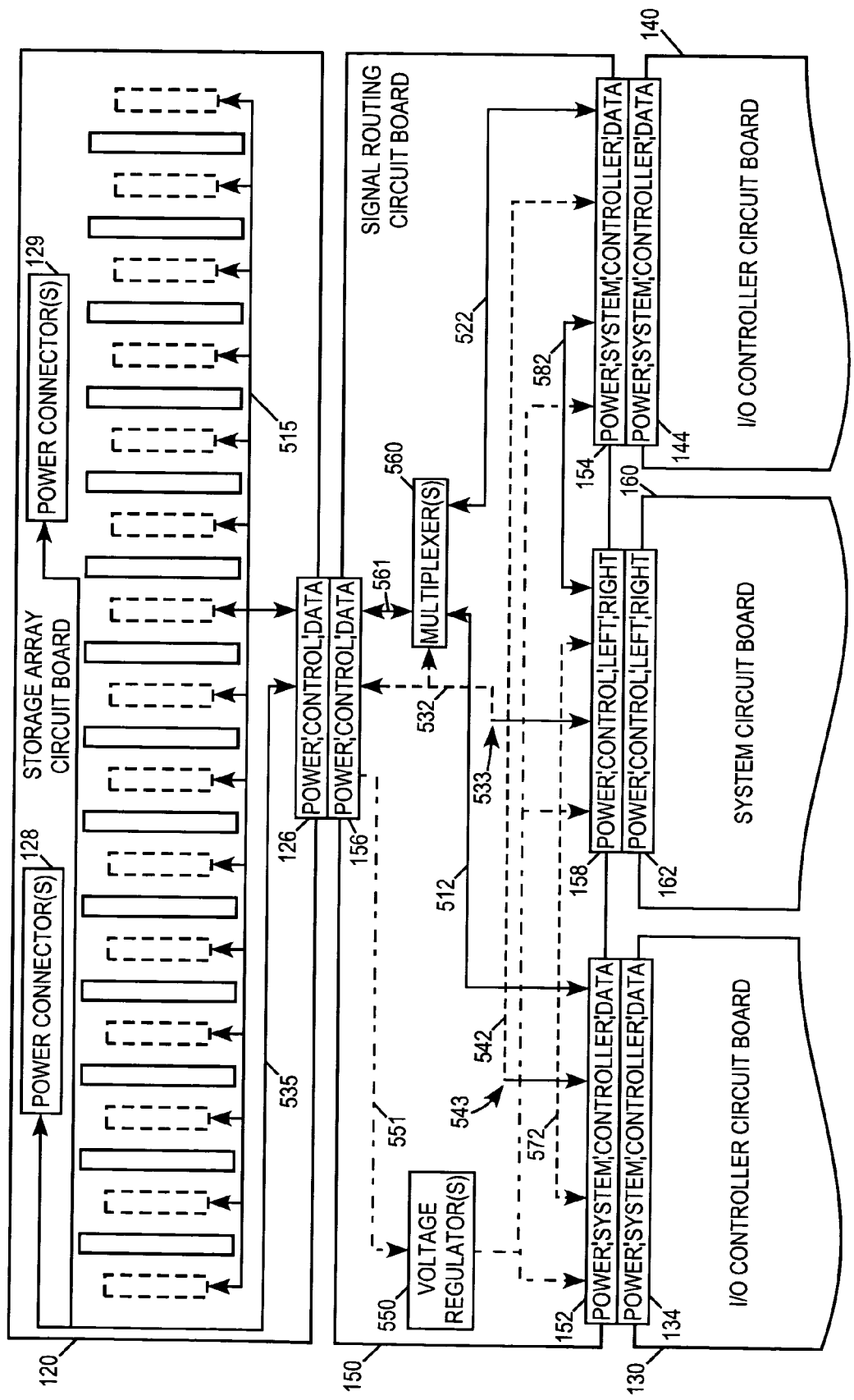
FIG. 5 illustrates, for another embodiment, a signal routing circuit board and a storage array circuit board for a storage system.

FIG. 5 illustrates, for one embodiment, signal routing circuit board 150 having one or more multiplexers 560 and supporting system circuit board 160. Signal routing circuit board 150 for one embodiment may define one or more data signal paths 512, one or more data signal paths 522, multiplexer(s) 560, a shared portion 561 of data signal paths 512 and 522, and/or one or more controller signal paths 542 similarly as data signal path(s) 312, data signal path(s) 322, multiplexer(s) 360, shared portion 361, and/or controller signal path(s) 342, respectively, of FIG. 3. Signal routing circuit board 150 for one embodiment may define one or more control signal paths 532, one or more system signal paths 572, and/or one or more system signal paths 582 similarly as control signal path(s) 432, system signal path(s) 472, and/or system signal path(s) 482, respectively, of FIG. 4. Signal routing circuit board 150 for one embodiment, as illustrated in FIG. 5, may define one or more of control signal path(s) 532 to control multiplexer(s) 560 from system circuit board 160. Storage array circuit board 120 for one embodiment may define one or more data signal paths 515 and/or one or more control signal paths 535 similarly as data signal path(s) 315 and/or control signal path(s) 335, respectively, of FIG. 3.

Signal routing circuit board 150 for one embodiment, as illustrated in FIG. 5, may have one or more voltage regulators 550 similarly as voltage regulator(s) 450 of FIG. 4 and define one or more power supply paths 551 similarly as power supply path(s) 451 of FIG. 4.

Signal routing circuit board 150, as illustrated in FIG. 5, for one embodiment may define data signal path(s) 512, data signal path(s) 522, and system signal path(s) 582 on a first signal layer and system signal path(s) 572 on a second signal layer above or below the first signal layer. Signal routing circuit board 150 may define control signal path(s) 532 on both the first and second signal layers, noting control signal path(s) 532 change layers at location 533, and define controller signal path(s) 542 on both the first and second signal layers, noting controller signal path(s) 542 change layers at location 543. Signal routing circuit board 150 for another embodiment may define data signal path(s) 512, data signal path(s) 522, control signal path(s) 532, controller signal path(s) 542, system signal path(s) 572, and/or system signal path(s) 582 on different layers and/or across multiple layers in any other suitable manner.

Arrangement of Components in Housing

Storage devices 110, storage array circuit board 120, signal routing circuit board 150, I/O controller circuit board 130, I/O controller circuit board 140, and/or system circuit board 160 may be positioned and oriented relative to one another in storage system 100 in any suitable manner.

Figure 6:
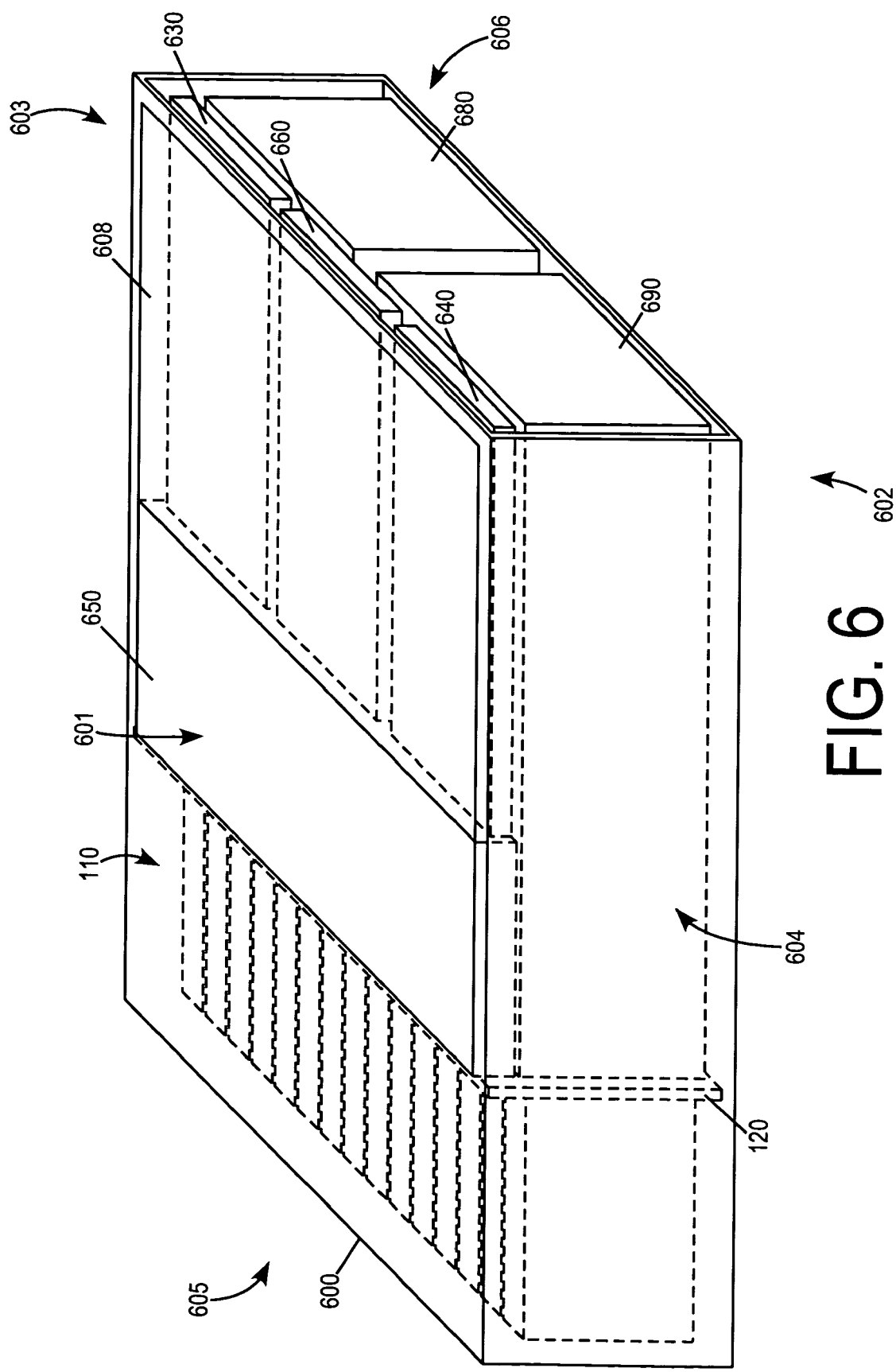
FIG. 6 illustrates, for one embodiment, an arrangement of components in a housing for a storage system.

FIG. 6 illustrates, for one embodiment, an arrangement of storage devices 110, storage array circuit board 120, a module 650 housing signal routing circuit board 150, a module 630 housing I/O controller circuit board 130, a module 640 housing I/O controller circuit board 140, a module 660 housing system circuit board 160, and power supplies 680 and 690 in a housing 600 for storage system 100. As illustrated in FIG. 6, housing 600 has a first side 601, a second side 602 opposite first side 601, a third side 603, a fourth side 604 opposite third side 603, a first end 605, and a second end 606 opposite first end 605. Although illustrated with first side 601 on top, housing 600 may be oriented in any suitable manner, such as with second side 602, third side 603, or fourth side 604 on top for example.

For one embodiment, as illustrated in FIG. 6, the arrangement of storage devices 110, storage array circuit board 120, modules 630, 640, 650, and 660, and power supplies 680 and 690 in housing 600 may facilitate the ability to repair storage system 100 or upgrade or substitute one or more functional blocks for storage system 100 on-site without removal of storage array circuit board 120 as one or more of storage devices 110, module 630, module 640, module 650, module 660, power supply 680, and/or power supply 690 may be considered customer or field replaceable units.

One or more of storage devices 110 for one embodiment, as illustrated in FIG. 6, may be inserted in housing 600 through an opening defined at first end 605 for removable coupling or connection to one or more storage device connectors on one surface of storage array circuit board 120. Storage array circuit board 120 for one embodiment, as illustrated in FIG. 6, may be mounted in housing 600 such that a surface of storage array circuit board 120 having storage device connectors generally extends between first side 601 and second side 602 and between third side 603 and fourth side 604 and faces first end 605, allowing one or more of storage devices 110 to be positioned in housing 600 at or near first end 605. Storage array circuit board 120 for one embodiment may have storage device connectors positioned to allow storage devices 110 to be positioned in housing 600 in a side-by-side manner between third side 603 and fourth side 604. Storage array circuit board 120 for another embodiment may have storage device connectors positioned to allow storage devices 110 to be positioned in housing 600 in a stacked manner between first side 601 and second side 602 to form one or more stacks of storage devices 110.

Module 650 for one embodiment, as illustrated in FIG. 6, may be inserted in housing 600 through an opening defined at first side 601 of housing 600 for removable coupling or connection of signal routing circuit board 150 to storage array circuit board 120 on a surface opposite storage devices 110 at or near an edge of an end or side of storage array circuit board 120 in a generally orthogonal orientation relative to storage array circuit board 120 such that a surface of signal routing circuit board 150 generally extends between third side 603 and fourth side 604 and between first end 605 and second end 606. Module 650 for one embodiment, as illustrated in FIG. 6, may be positioned in housing 600 such that module 650 is generally planar with a surface at first side 601 of housing 600. Module 650 may be supported in or by housing 600 in any suitable manner.

Housing 600 for one embodiment, as illustrated in FIG. 6, may comprise a cover 608 that may be opened at first side 601 or removed from housing 600 to help insert module 650 in housing 600 for removable coupling or connection of signal routing circuit board 150 to storage array circuit board 120. Housing 600 for one embodiment may define supports or rails along the inner walls of third and fourth sides 603 and 604 to allow module 650 to slide in and out of position relative to storage array circuit board 120. Storage array circuit board 120 and signal routing circuit board 150 for one embodiment may define suitable keying structures in association with connector(s) 126 and connector(s) 156, respectively, to help align signal routing circuit board 150 relative to storage array circuit board 120. Module 650 for one embodiment may define a lip along at least a portion of its outer perimeter to overlie a portion of first side 601 of housing 600 to help minimize electromagnetic interference.

Module 650 for another embodiment may be inserted in housing 600 through an opening defined at second end 606.

Module 650 for one embodiment may be removed from housing 600 through an opening defined at first side 601 or at second end 606, allowing any electronics of signal routing circuit board 150 to be removed from housing 600 without removal of storage array circuit board 120.

Modules 630 and 640 for one embodiment, as illustrated in FIG. 6, may each be inserted in housing 600 through an opening defined at second end 606 near first side 601 for removable coupling or connection of I/O controller circuit boards 130 and 140, respectively, to signal routing circuit board 150 at or near an edge of an end or side of signal routing circuit board 150 in a generally planar orientation relative to signal routing circuit board 150. Modules 630 and 640 for another embodiment may each be inserted in housing 600 through an opening defined at first side 601 near second end 606. Modules 630 and 640 for one embodiment may be removed from housing 600 through an opening defined at second end 606 or at first side 601.

Module 660 for one embodiment, as illustrated in FIG. 6, may be inserted in housing 600 through an opening defined at second end 606 near first side 601 for removable coupling or connection of system circuit board 160 to signal routing circuit board 150 at or near an edge of an end or side of signal routing circuit board 150 in a generally planar orientation relative to signal routing circuit board 150. Module 660 for another embodiment may be inserted in housing 600 through an opening defined at first side 601 near second end 606. Module 660 for one embodiment may be removed from housing 600 through an opening defined at second end 606 or at first side 601.

Power supplies 680 and 690 for one embodiment, as illustrated in FIG. 6, may be inserted in housing 600 through an opening defined at second end 606 near second side 602 for removable coupling or connection to storage array circuit board 120 on a surface opposite storage devices 110 at or near an edge of an end or side of storage array circuit board 120. Power supplies 680 and 690 for one embodiment may be removed from housing 600 through an opening defined at second end 606.

For another embodiment, modules 630, 640, and/or 660 may be positioned and oriented relative to module 650 in any other suitable manner for removable coupling or connection of I/O controller circuit board 130, I/O controller circuit board 140, and/or system circuit board 160, respectively, to signal routing circuit board 150. As one example, modules 630, 640, and 660 may be positioned in a generally orthogonal orientation relative to signal routing circuit board 150 and in a side-to-side manner with power supplies 680 and 690 between third side 603 and fourth side 604.

In the foregoing description, one or more embodiments of the present invention have been described. It will, however, be evident that various modifications and changes may be made thereto without departing from the broader spirit or scope of the present invention as defined in the appended claims. The specification and drawings are, accordingly, to be regarded in an illustrative rather than a restrictive sense.

What is claimed is:

1. An apparatus comprising:
input/output (I/O) controller circuit boards;
a storage array circuit board having storage device connectors to couple storage devices to the storage array circuit board; and
a signal routing circuit board having one or more voltage regulators and connectors to couple the storage array circuit board to the signal routing circuit board, connectors to couple (I/O) controller circuit boards to the signal routing circuit board, and one or more multiplexers to route data signals in a selective manner along one or more first data signal paths between a first (I/O) controller circuit board and the storage array circuit board and alone one or more second data signal paths between a second (I/O) controller circuit board and the storage array circuit board, wherein the second data signal path(s) share a portion of one or more data signal paths of the first data signal path(s), wherein edge connectors of the signal routing board removably connect to both the (I/O) controller circuit boards and the storage array circuit board while the storage array circuit board remains connected to a housing of the apparatus, the signal routing board and (I/O) controller circuit boards being horizontally disposed with respect to the storage array circuit board being vertically disposed.

2. The apparatus of claim 1, wherein the signal routing circuit board has one or more connectors to couple a system circuit board to the signal routing circuit board.

3. The apparatus of claim 1, wherein the signal routing circuit board defines one or more paths to supply power from the storage array circuit board to one or more (I/O) controller circuit boards.

4. The apparatus of claim 1, wherein the one or more voltage regulators supplies power at one or more levels to one or more I/O controller circuit boards.

5. The apparatus of claim 1, wherein the signal routing circuit board defines one or more shared control signal paths to route power control and/or status signals between the storage array circuit board and one or more I/O controller circuit boards.

6. The apparatus of claim 1, wherein the signal routing circuit board defines one or more signal paths to route signals between I/O controller circuit boards.

7. A storage system comprising:
a housing;
a storage array circuit board for mounting in the housing, the storage array circuit board having a plurality of storage device connectors for removably coupling a plurality of storage devices to the storage array circuit board;
at least one input/output (I/O) controller circuit board for insertion in the housing, each I/O controller circuit board for communicating with storage devices; and
a signal routing circuit board having electronics common to circuit boards connected thereto, the signal routing circuit board for removable connection to the storage array circuit board and with each I/O controller circuit board,
wherein the electronics are removable from the housing without removal of the storage array circuit board wherein the I/O controller board and signal routing circuit board connect end-to-end and are horizontally disposed with respect to the storage array circuit board vertically disposed in the housing.

8. The storage system of claim 7, wherein the signal routing circuit board has one or more multiplexers to route data signals in a selective manner along one or more first data signal paths between a first I/O controller circuit board and the storage array circuit board and along one or more second data signal paths between a second I/O controller circuit board and the storage array circuit board, and
wherein the second data signal path(s) share a portion of one or more data signal paths of the first data signal path(s).

9. The storage system of claim 7, wherein the signal routing circuit board is positioned in a social orientation relative to the storage array circuit board when connected to the storage array circuit board.

10. The storage system of claim 7, wherein at least one I/O controller circuit board is positioned in a generally planar orientation relative to the signal routing circuit board when connected to the signal routing circuit board.

11. The storage system of claim 7, wherein the housing defines an opening in a side for insertion of the signal routing circuit board in the housing and an opening in an end for insertion of at least one I/O controller circuit board.

12. The storage system of claim 7, comprising a system circuit board for removable connection to the signal routing circuit board.

13. The storage system of claim 7, comprising one or more power supplies for insertion in the housing and removable coupling to the storage array circuit board.

14. The storage system of claim 7, wherein the signal routine circuit board has one or more voltage regulators to supply power at one or more levels to at least one I/O controller circuit board.

15. The storage system of claim 7, wherein the signal routing circuit board defines one or more shared control signal paths to route power control and/or status signals between the storage array circuit board and at least one I/O controller circuit board.

16. The storage system of claim 7, wherein the signal routing circuit board defines one or more signal paths to route signals between I/O controller circuit boards.

* * * * *

UNITED STATES PATENT AND TRADEMARK OFFICE
CERTIFICATE OF CORRECTION

PATENT NO. : 7,281,063 B2  Page 1 of 1
APPLICATION NO. : 10/624625
DATED : October 9, 2007
INVENTOR(S) : Anthony J. Benson et al.

It is certified that error appears in the above-identified patent and that said Letters Patent is hereby corrected as shown below:

In column 9, line 38, delete "110" and insert -- I/O --, therefor.

In column 14, line 50, in Claim 1, delete "(I/O)" and insert -- I/O --, therefor.

In column 14, line 53, in Claim 1, delete "(I/O)" and insert -- I/O --, therefor.

In column 14, line 54, in Claim 1, delete "circult" and insert -- circuit --, therefor.

In column 14, line 55, in Claim 1, delete "alone" and insert -- along --, therefor.

In column 14, line 56, in Claim 1, delete "(I/O)" and insert -- I/O --, therefor.

In column 14, line 61, in Claim 1, delete "(I/O)" and insert -- I/O --, therefor.

In column 14, line 64, in Claim 1, delete "(I/O)" and insert -- I/O --, therefor.

In column 15, line 6, in Claim 3, delete "(I/O)" and insert -- I/O --, therefor.

In column 16, line 10, in Claim 9, delete "social" and insert -- generally orthogonal --, therefor.

In column 16, line 29, in Claim 14, delete "routine" and insert -- routing --, therefor.

Signed and Sealed this

Fifth Day of August, 2008

JON W. DUDAS
*Director of the United States Patent and Trademark Office*